(12) United States Patent
Amano et al.

(10) Patent No.: US 11,827,052 B2
(45) Date of Patent: Nov. 28, 2023

(54) VEHICLE WHEEL

(71) Applicant: CENTRAL MOTOR WHEEL CO., LTD., Anjo (JP)

(72) Inventors: Takanori Amano, Okazaki (JP); Atsushi Yamazumi, Chiryu (JP)

(73) Assignee: CENTRAL MOTOR WHEEL CO., LTD., Anjo (JP)

( * ) Notice: Subject to any disclaimer, the term of this patent is extended or adjusted under 35 U.S.C. 154(b) by 318 days.

(21) Appl. No.: 17/129,000

(22) Filed: Dec. 21, 2020

(65) Prior Publication Data

US 2021/0221168 A1    Jul. 22, 2021

(30) Foreign Application Priority Data

Jan. 20, 2020   (JP) ................................. 2020-006814

(51) Int. Cl.
| | | |
|---|---|---|
| *B60B 1/06* | (2006.01) | |
| *B60B 1/02* | (2006.01) | |
| *B60B 1/12* | (2006.01) | |
| *B60B 1/08* | (2006.01) | |

(52) U.S. Cl.
CPC .............. *B60B 1/06* (2013.01); *B60B 1/0246* (2013.01); *B60B 1/08* (2013.01); *B60B 1/12* (2013.01)

(58) Field of Classification Search
CPC .. B60B 1/06; B60B 5/02; B60B 3/007; B60B 3/10; B60B 1/12; B60B 1/08; B60B 1/0246
See application file for complete search history.

(56) References Cited

U.S. PATENT DOCUMENTS

| | | | | |
|---|---|---|---|---|
| 6,193,322 | B1* | 2/2001 | Corridori | B60B 5/02 |
| | | | | 301/80 |
| 6,231,129 | B1* | 5/2001 | Stach | B60B 1/14 |
| | | | | 301/95.104 |
| 7,018,000 | B2* | 3/2006 | Alff | B60B 3/12 |
| | | | | 301/64.101 |
| 9,302,535 | B2* | 4/2016 | Goto | B60B 3/041 |
| 11,260,689 | B2* | 3/2022 | Ziller | B60B 5/02 |

(Continued)

FOREIGN PATENT DOCUMENTS

| | | |
|---|---|---|
| DE | 10132005 A1 | 1/2003 |
| EP | 2208621 A1 | 7/2010 |

(Continued)

OTHER PUBLICATIONS

May 9, 2023 Office Action issued in Japanese Patent Application No. 2020-006814.

*Primary Examiner* — Scott A Browne
(74) *Attorney, Agent, or Firm* — Oliff PLC (57) ABSTRACT

A vehicle wheel includes a hub portion attached to a vehicle, a substantially cylindrical rim portion, and a plurality of spoke portions connected to the rim portion and the hub portion. The plurality of the spoke portions have a window portion that penetrates in a wheel axial direction. An inclined surface is provided on a wheel back side of each of the spoke portions such that the inclined surface inclines toward a wheel front side from a center in a wheel circumferential direction toward the window portion. The inclined surface is provided at a portion including one end portion or both end portions in the wheel circumferential direction.

3 Claims, 9 Drawing Sheets

(56) References Cited

U.S. PATENT DOCUMENTS

| | | | |
|---|---|---|---|
| 2005/0006945 A1* | 1/2005 | Alff | B60B 3/12 |
| | | | 301/63.108 |
| 2011/0193405 A1* | 8/2011 | Kihara | B60B 3/044 |
| | | | 301/64.102 |
| 2016/0023509 A1 | 1/2016 | Chenault, III et al. | |
| 2016/0361946 A1 | 12/2016 | Imai et al. | |
| 2019/0105943 A1* | 4/2019 | Friske | B60B 7/061 |
| 2019/0143745 A1* | 5/2019 | Ziller | B60B 1/003 |
| | | | 301/55 |

FOREIGN PATENT DOCUMENTS

| | | |
|---|---|---|
| JP | S62-64601 U | 4/1987 |
| JP | H06-12101 U | 2/1994 |
| JP | 2005-119355 A | 5/2005 |
| JP | 2012-224136 A | 11/2012 |
| JP | 2017-001549 A | 1/2017 |
| JP | 2018-020640 A | 2/2018 |
| WO | 2017/205821 A1 | 11/2017 |
| WO | WO-2021047963 A1 * 3/2021 ............. B29C 69/02 |  |

* cited by examiner

FIG. 1

WHEEL CIRCUMFERENTIAL DIRECTION

VEHICLE WHEEL

CROSS-REFERENCE TO RELATED APPLICATION

This application claims priority to Japanese Patent Application No. 2020-006814 filed on Jan. 20, 2020, incorporated herein by reference in its entirety.

BACKGROUND

1. Technical Field

The disclosure relates to a vehicle wheel in which a window portion is provided between spoke portions.

2. Description of Related Art

In vehicle wheels, there is known a technique for improving aerodynamic characteristics by changing an air flow by means of protrusions provided on spoke portions. For example, Japanese Unexamined Patent Application Publication No. 2018-20640 (JP 2018-20640 A) describes a technique in which a protrusion is provided to project toward the wheel front side at an end portion of a spoke portion in a wheel circumferential direction and a flow of running wind along an outer surface of a vehicle body is changed with the protrusion so as to improve aerodynamic characteristics. Japanese Unexamined Patent Application Publication No. 2012-224136 (JP 2012-224136 A) describes a technique in which a protrusion is provided on a back side of a spoke portion in consideration of flexibility in wheel design so as to attract running wind toward the wheel side using the protrusion, which improves the aerodynamic characteristics.

SUMMARY

The inventor of the present application focused on the point that the aerodynamic characteristics exerted on a vehicle are changed depending on a shape of the spoke portion. On the other hand, there was a concern that the flexibility in wheel design would be degraded depending on the shape of the spoke portion. In particular, with the technique in JP 2018-20640 A, the flexibility in the design is degraded due to providing the protrusion on the wheel front side. The disclosure can improve the aerodynamic characteristics exerted on the vehicle while suppressing degradation of the flexibility in wheel design.

An aspect of the disclosure is a vehicle wheel. The vehicle wheel includes: a hub portion attached to a vehicle; a rim portion having a substantially cylindrical shape; and a plurality of spoke portions connected to the rim portion and the hub portion. The plurality of the spoke portions have a window portion that is a space between the spoke portions adjacent to each other and that penetrates in a wheel axial direction. An inclined surface is provided on a wheel back side of each of the spoke portions such that the inclined surface inclines toward a wheel front side from a center in a wheel circumferential direction toward the window portion. The inclined surface is provided at a portion including one end portion or both end portions in the wheel circumferential direction.

With the above configuration, the inclined surface is provided on the wheel back side of the spoke portion in a portion including the one end portion or the both end portions in the wheel circumferential direction. The inclined surface inclines toward the wheel front side from the center in the wheel circumferential direction toward the window portion. Therefore, aerodynamic characteristics can be improved while the vehicle is traveling. Moreover, because the inclined surface is provided on the wheel back side of the spoke portion, the aerodynamic characteristics can be improved while suppressing degradation of a flexibility in the wheel design.

In the vehicle wheel, the spoke portion may have a width in the wheel circumferential direction being larger than a thickness in a wheel axis direction. At least a part of the inclined surface may be included in a division that is closest to the window portion when the spoke portion is divided into four equal portions in the wheel circumferential direction. In the vehicle wheel, the one end portion or the both end portions of the spoke portion in the wheel circumferential direction may be included in a division on the wheel front side when the spoke portion is divided into two equal portions in the wheel axial direction. In the vehicle wheel, the entire inclined surface may be included in a division on the wheel front side when the spoke portion is divided into two equal portions in the wheel axial direction.

In the vehicle wheel, the spoke portion may include a thick portion that is thick in the wheel axis direction and a thin portion that is thinner than the thick portion. The inclined surface may be provided in the thin portion, and a thickness of a portion of the thin portion including the inclined surface may be constant.

With the above configuration, the inclined surface is provided on the wheel back side of the spoke portion in a portion including the one end portion or the both end portions in the wheel circumferential direction. The inclined surface inclines toward the wheel front side from the center in the wheel circumferential direction toward the window portion. Therefore, aerodynamic characteristics can be improved while the vehicle is traveling. Moreover, because the inclined surface is provided on the wheel back side of the spoke portion, the aerodynamic characteristics can be improved while suppressing degradation of the flexibility in the wheel design.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
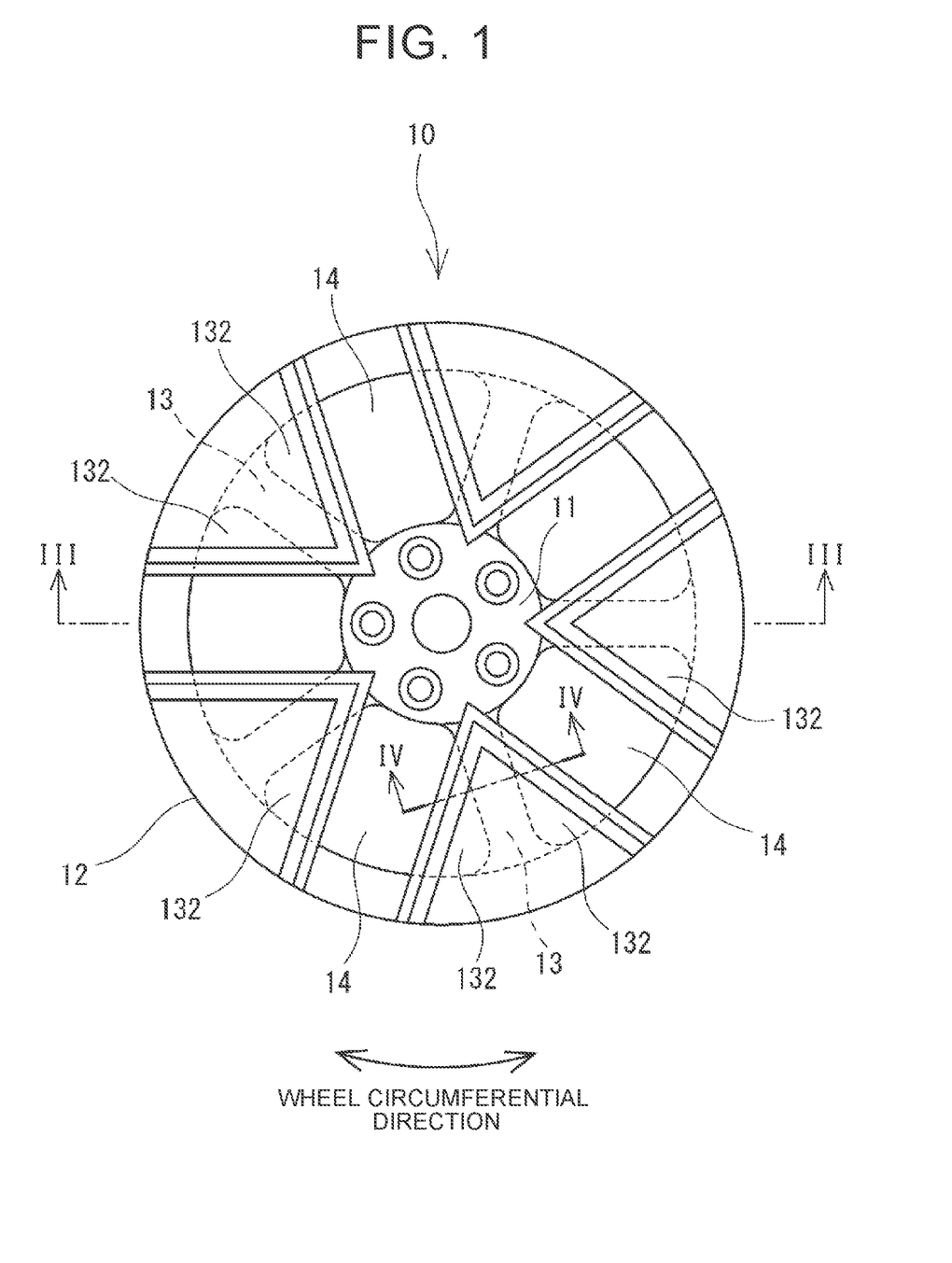
FIG. 1 is a front view of a vehicle wheel showing a first embodiment of the disclosure.
Figure 2:
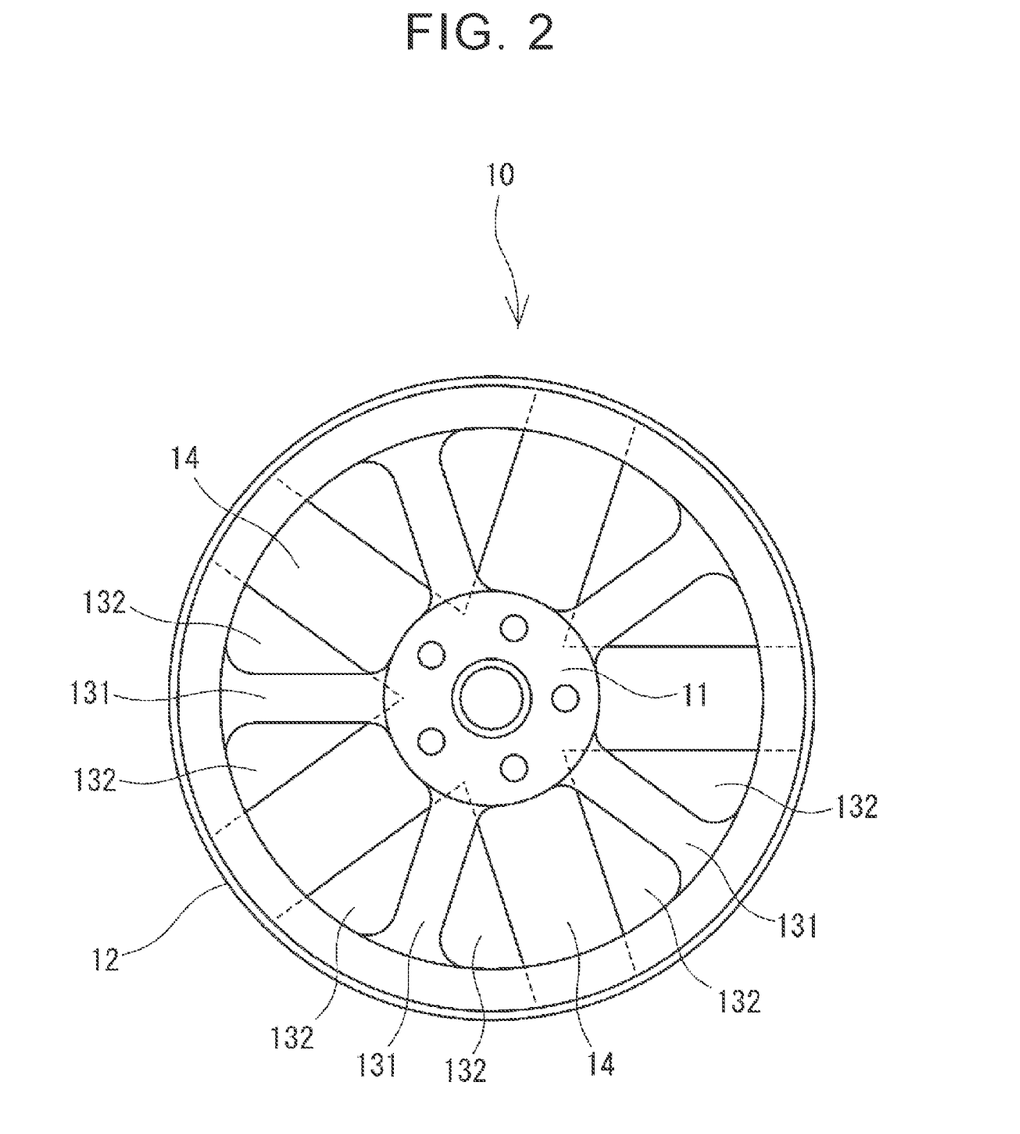
FIG. 2 is a rear view of the vehicle wheel shown in FIG. 1.
Figure 3:
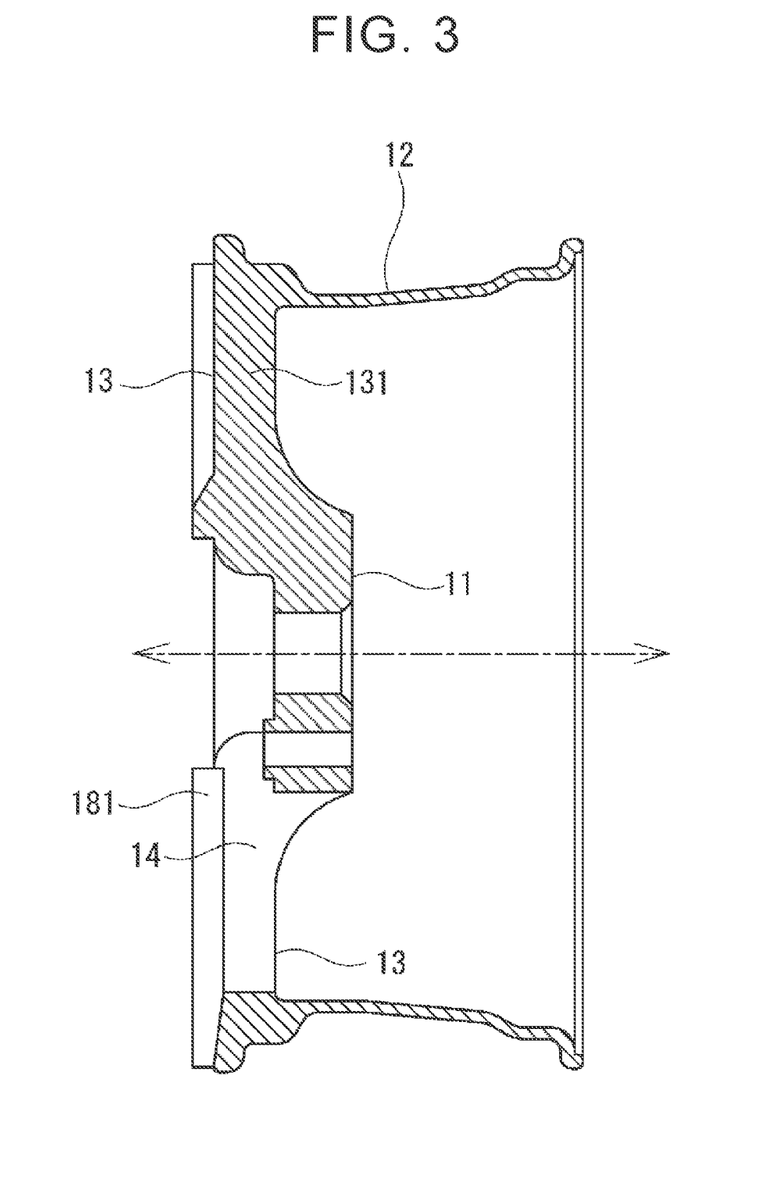
FIG. 3 is a sectional view taken along a line III-III in FIG. 1.

Hereinafter, a first embodiment in which the disclosure is embodied in a vehicle wheel that is made of aluminum alloy and equipped in an automobile will be described with reference to the drawings. As shown in FIGS. 1, 2, and 3, a vehicle wheel 10 according to the first embodiment has a hub portion 11 attached to an axle (not shown) of an automobile, a cylindrical rim portion 12 on which a tire is mounted, and, for example, five spoke portions 13 connected to the rim portion 12 and the hub portion 11.

Each of the spoke portions 13 includes a thick portion 131 that is thick in a wheel axial direction (direction indicated by a chain line arrow in FIG. 3) and thin portions 132 that are thinner than the thick portion 131. The thick portion 131 extends radially between the hub portion 11 and the rim portion 12. The thin portions 132 are provided so as to project from the front side of the thick portion 131 toward both sides in a wheel circumferential direction (see FIGS. 1 and 2).

A window portion 14 is provided so as to penetrate the vehicle wheel 10 in the wheel axial direction between the two spoke portions 13 (the thin portions 132) adjacent to each other in the wheel circumferential direction, and is defined to have a long rectangular shape in the wheel radial direction.

Figure 4:
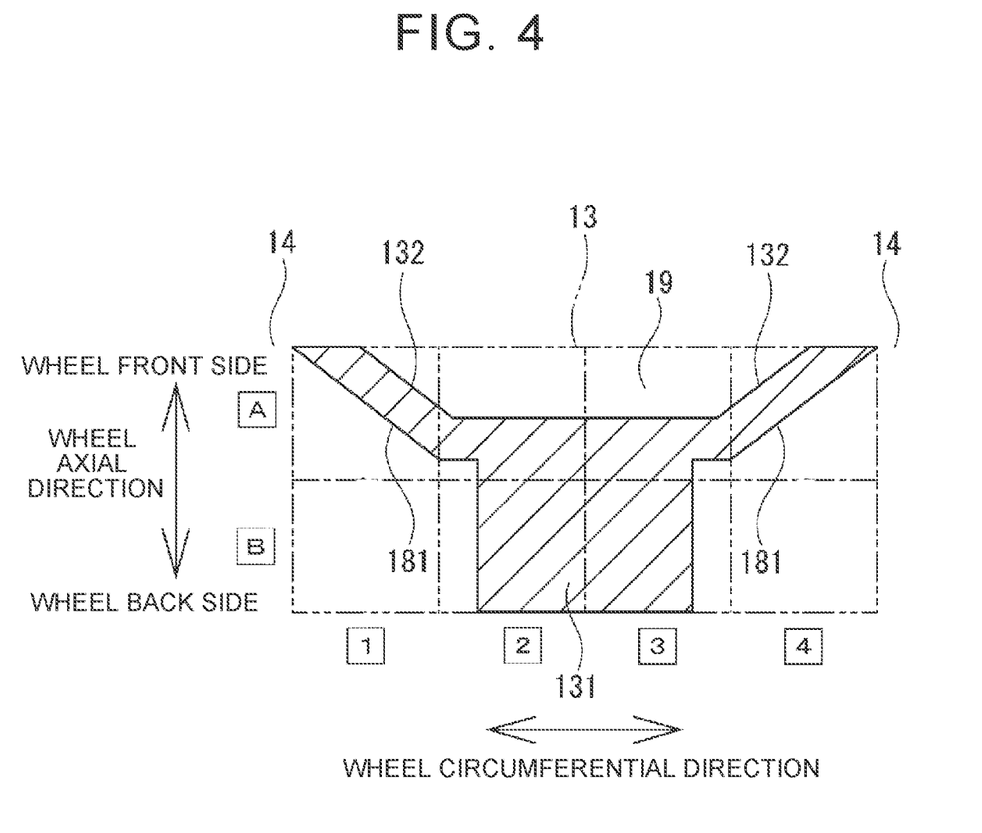
FIG. 4 is a sectional view taken along the line IV-IV of FIG. 1 showing a spoke portion according to the first embodiment.

FIG. 4 is a sectional view taken along a line IV-IV of FIG. 1 showing the spoke portion 13 according to the first embodiment. The section taken along the line IV-IV is a section obtained by cutting the spoke portion 13 extending in a wheel radial direction at a position closer to a radially outer periphery, in the wheel circumferential direction. Here, when the section of the spoke portion 13 is divided into two equal portions in a wheel axial direction, a portion on the wheel front side is defined as a division (A) and a portion on the wheel back side is defined as a division (B) in order to explain the section of the spoke portion 13. Further, when the section of the spoke portion 13 is divided into four equal portions in the wheel circumferential direction, the four equal portions are defined as a division (1), a division (2), a division (3), and a division (4), respectively, in order from the one end portion side. Note that, a portion where the respective divisions intersect with each other is shown as a division (A1).

The section of the spoke portion 13 has a larger width dimension in the wheel circumferential direction than a thickness dimension in the wheel axial direction. The thin portions 132 that are provided at respective end portions of the spoke portions 13 in the wheel circumferential direction are included in the division (A), and only the thick portion 131 is included in the division (B).

The thin portion 132 projects diagonally from the thick portion 131 toward the front side of the wheel and toward the window portion 14 in the divisions (A1, A4). Therefore, a recessed portion 19 is provided on the wheel front side in the section of the spoke portion 13. Further, an inclined surface 181 is provided on the wheel back side of the thin portion 132. The inclined surface 181 inclines toward the wheel front side from the center in the wheel circumferential direction toward the window portion 14.

The result of investigating the aerodynamic characteristics of the vehicle wheel 10 according to the first embodiment proves that the inclined surface 181 contributes to improvement of the aerodynamic characteristics. The inclined surface 181 is provided on the wheel back side, not on the wheel front side, which affects the wheel design. Therefore, in the vehicle wheel 10 according to the first embodiment, the aerodynamic characteristics can be improved while suppressing degradation of the flexibility in the wheel design.

Other Embodiments

Next, other embodiments of the disclosure will be described. FIGS. 5 to 9 are sectional views showing the spoke portion 13 according to the other embodiments.

Figure 5:
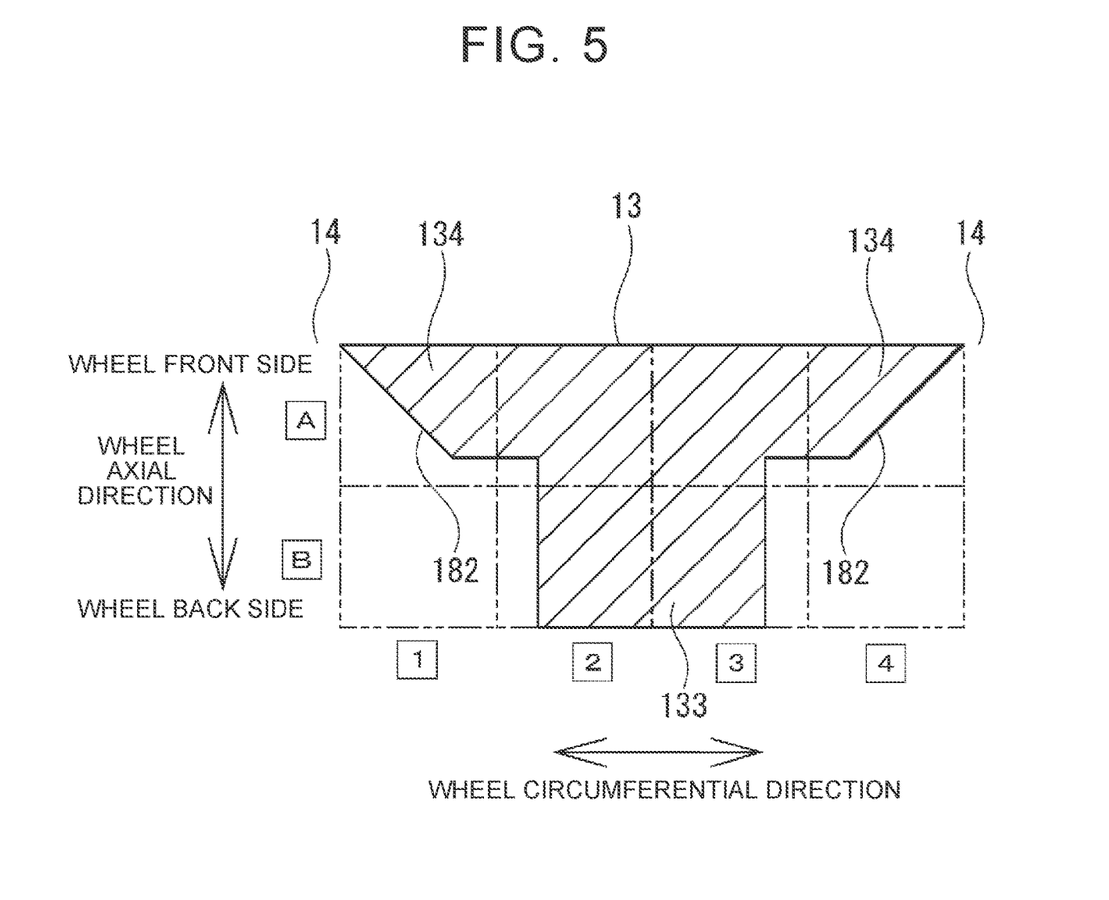
FIG. 5 is a sectional view showing the spoke portion according to a second embodiment.

The spoke portion 13 according to a second embodiment shown in FIG. 5 includes thin portions 134 that project from respective sides of a thick portion 133 in the wheel circumferential direction toward the window portions 14. Each of the thin portions 134 has an inclined surface 182 that is provided on the wheel back side of the thin portion 134 and inclines toward the wheel front side from the center in the wheel circumferential direction toward the window portion 14. Therefore, a section of the spoke portion 13 according to the second embodiment is different from the section of the spoke portion 13 according to the first embodiment in that the front side of the spoke portion 13 is flat and does not include the recessed portion 19, and in that the thickness of the thin portion 134 becomes thinner from the center in the wheel circumferential direction toward the window portion 14.

The result of investigating the aerodynamic characteristics of the vehicle wheel 10 having the section of the spoke portion 13 according to the second embodiment proves that the inclined surface 182 contributes to improvement of the aerodynamic characteristics, similar to the spoke portion 13 according to the first embodiment. As described above, with the vehicle wheel 10 according to the second embodiment, the aerodynamic characteristics can be improved by the inclined surfaces 181, 182 provided on the wheel back side, regardless of the shape of the wheel front side that affects the wheel design.

Figure 6:
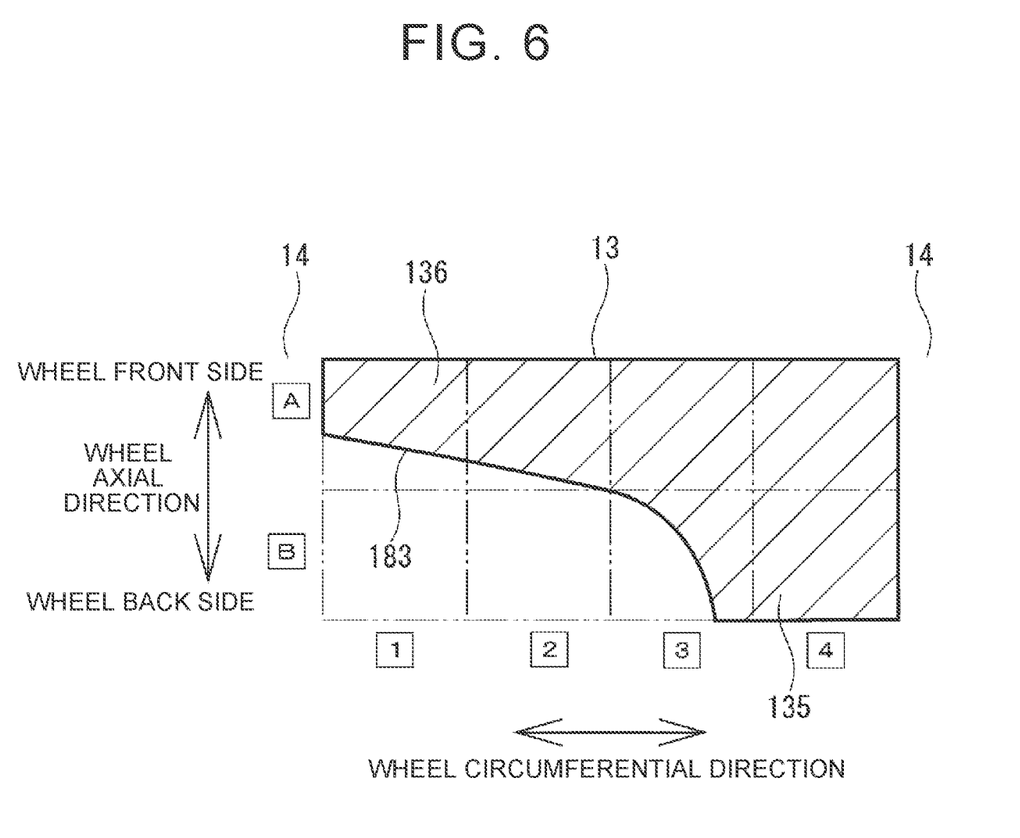
FIG. 6 is a sectional view showing the spoke portion according to a third embodiment.

The spoke portion 13 according to a third embodiment shown in FIG. 6 is flat on the wheel front side. The spoke portion 13 includes a thick portion 135 that is a portion on the division (4) side being relatively thick, and a thin portion 136 that is a portion on the division (1) side being relatively thin. The spoke portion 13 is asymmetrical in the wheel circumferential direction. The thin portion 136 includes an inclined surface 183 that inclines toward the wheel front side from the center in the wheel circumferential direction toward the window portion 14 in the divisions (A1 and A2). As described above, even when the section of the spoke portion 13 is asymmetrical in the wheel circumferential direction, the aerodynamic characteristics can be improved with the inclined surface 183. However, in this case, it should be noted that the aerodynamic characteristics change depending on a traveling direction of the vehicle (rotational direction of the vehicle wheel 10).

Figure 7:
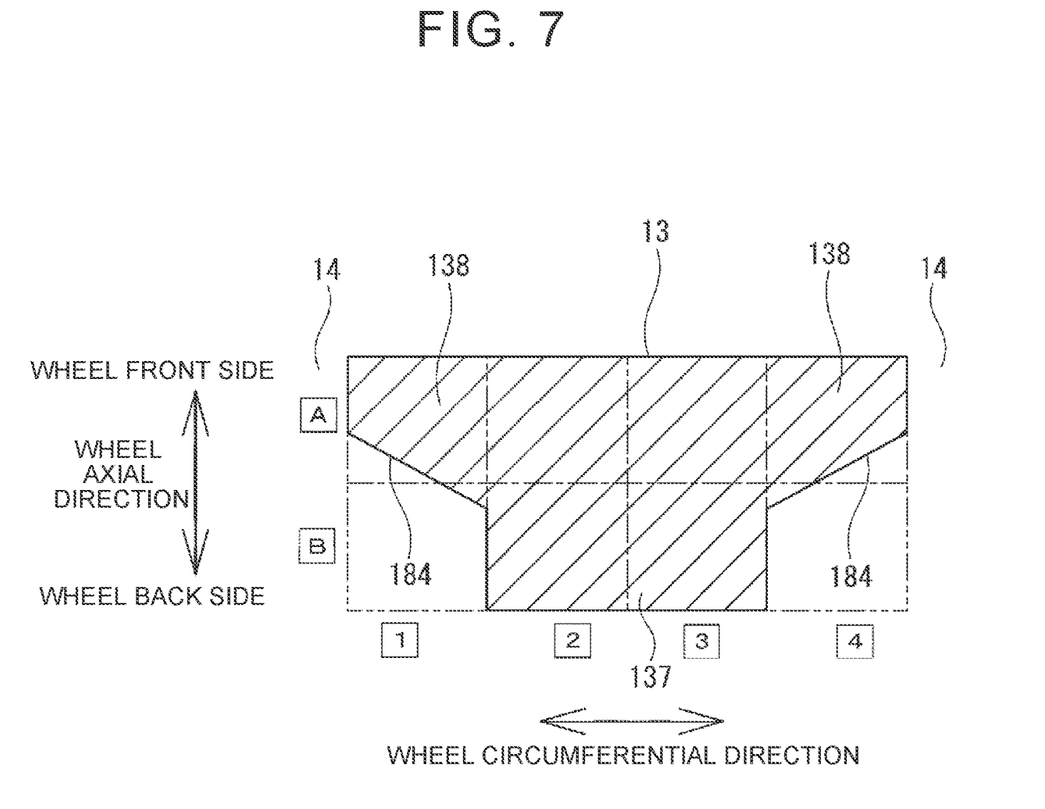
FIG. 7 is a sectional view showing the spoke portion according to a fourth embodiment.

The spoke portion 13 according to a fourth embodiment shown in FIG. 7 includes thin portions 138 that project from respective sides of a thick portion 137 in the wheel circumferential direction toward the window portions 14. Each of the thin portions 138 has an inclined surface 184 that is provided on the wheel back side of the thin portion 138 and inclines toward the wheel front side from the center in the wheel circumferential direction toward the window portion 14. Therefore, the section of the spoke portion 13 according to the fourth embodiment is different from the section of the spoke portion 13 according to the second embodiment in that an edge of the thin portion 138 is relatively thick and the inclined surfaces 184 are partially included in the divisions (B1, B4). The result of comparing and investigating the aerodynamic characteristics of the vehicle wheel 10 having the spoke portions 13 according to the first and second embodiments and the vehicle wheel 10 having the spoke portions 13 according to the fourth embodiment proves that the inclined surfaces 181, 182 according to the first and the second embodiments achieve more contribution to improvement of the aerodynamic characteristics, than the inclined surface 184 according to the fourth embodiment. On the basis of the above, it is estimated that the case where the entire inclined surface is included in the division (A) can achieve more contribution to improvement of the aerodynamic characteristics.

Figure 8:
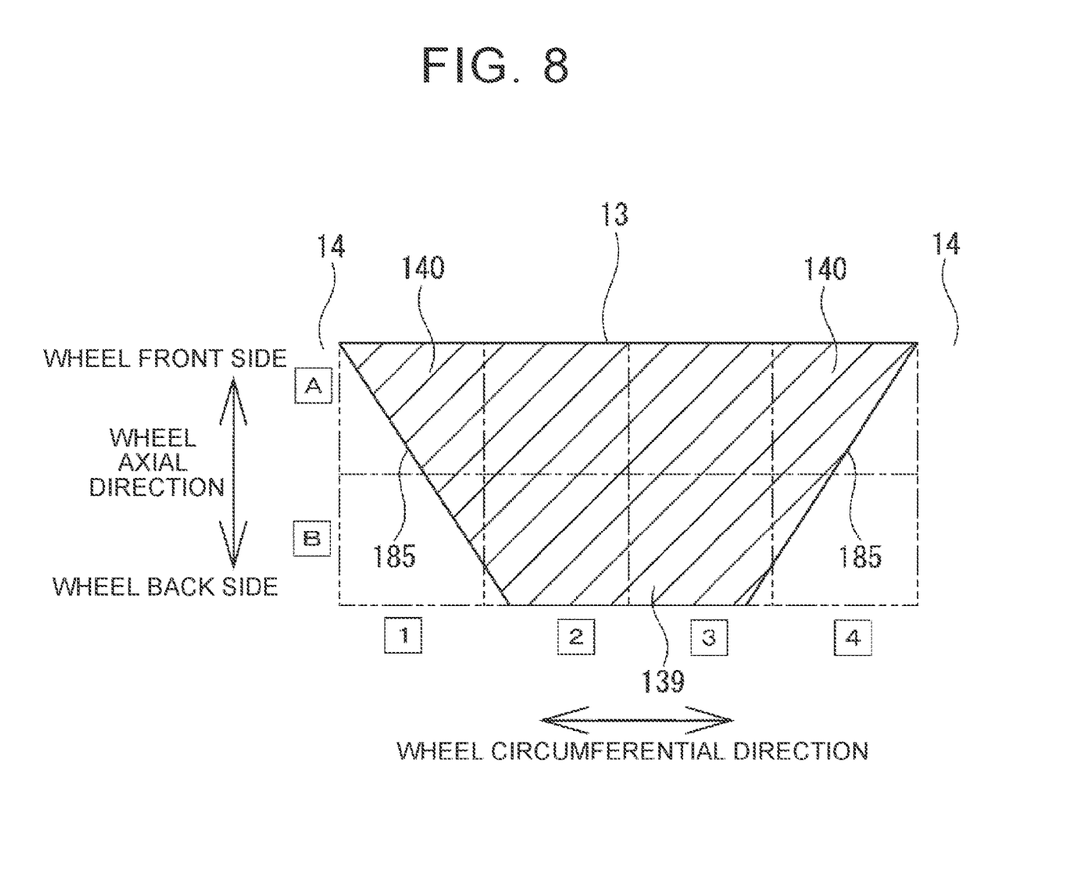
FIG. 8 is a sectional view showing the spoke portion according to a fifth embodiment.

The spoke portion 13 according to a fifth embodiment shown in FIG. 8 includes thin portions 140 that project from respective sides of a thick portion 139 in the wheel circumferential direction toward the window portions 14. Each of the thin portions 140 has an inclined surface 185 that is provided on the wheel back side of the thin portion 140 and inclines toward the wheel front side from the center in the wheel circumferential direction toward the window portion 14. The inclined surface 185 is provided over the entire wheel axial direction. As described above, the aerodynamic characteristics can be improved by the inclined surface 185 being provided over the entire wheel axial direction.

Figure 9:
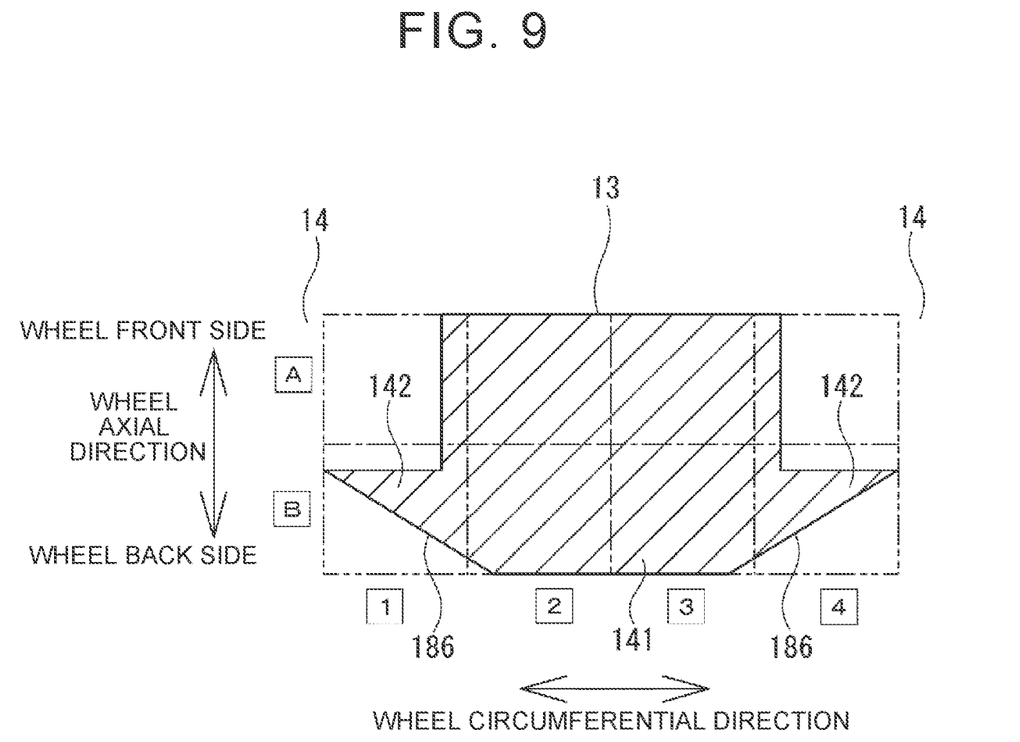
FIG. 9 is a sectional view showing the spoke portion according to a sixth embodiment.

The spoke portion 13 according to a sixth embodiment shown in FIG. 9 includes thin portions 142 that project from respective sides of a thick portion 141 in the division (B) toward the window portions 14. Each of the thin portions 142 has an inclined surface 186 that is provided on the wheel back side of the thin portion 142 and inclines toward the wheel front side from the center in the wheel circumferential direction toward the window portion 14. Therefore, in the section of the spoke portion 13 according to the sixth embodiment, the entire inclined surfaces 186 is included in the division (B), and both end portions of the inclined surface 186 are included in the division (B). The result of comparing and investigating the aerodynamic characteristics of the vehicle wheel 10 having the spoke portion 13 according to the sixth embodiment and the vehicle wheel 10 having the spoke portions 13 according to the other embodiments proves that the inclined surface 186 according to the sixth embodiment achieves less contribution, than the inclined surfaces 181 to 185 according to the other embodiments. On the basis of the above, it is estimated that the case where the end portions of the inclined surface in the wheel circumferential direction are included in the division (A) can achieve more contribution to improvement of the aerodynamic characteristics.

The disclosure is not limited to the above embodiments, and as illustrated below, may be implemented by appropriately changing the shape and the configuration of each portion without departing from the spirit of the disclosure.

In the above embodiments, the shape of the spoke portion 13 on the wheel front side is relatively simple, for example, a flat surface or having the recessed portion 19. However, as long as the spoke portion includes the inclined surface according to the disclosure, any shape may be adopted as the shape of the spoke portion on the wheel front side.

In the above embodiments, the inclined surface has a flat surface. However, the inclined surface may have a curved surface or a stepped surface as long as the inclined surface inclines toward the wheel front side from the center in the wheel circumferential direction toward the window portion.

In the above embodiments, the entire thick portion has a predetermined thickness. However, from the viewpoint of weight reduction, the wheel back side of the thick portion may be partially recessed.

In the above embodiments, the disclosure is applied to a vehicle wheel made of an aluminum alloy. However, in another embodiment, the disclosure may be applied to a vehicle wheel formed of a material such as magnesium or resin.

When providing an inclined surface on the spoke portion, various processing methods, such as forming, by machining, the inclined surface on a wheel material cast in a casting process, forming the inclined surface on the spoke portion by welding, or forming the inclined surface on the spoke portion using a cover of the vehicle wheel, may be adopted without departing from the spirit of the disclosure.

In the drawings illustrating the above embodiments, the thick portion of the spoke portion is shown parallel to the wheel axial direction in the section of the spoke portion. However, with an actual vehicle wheel, a draft (e.g. about 5 degrees) required for manufacturing reasons, such as casting, may be provided. In this case, the portion recognized as the draft required for manufacturing reasons is not included in the inclined surface according to the disclosure.

In the drawings illustrating the above embodiment, the edge of the thin portion of the spoke portion is shown to have an acute angle. However, the edge may have a curved surface. However, even when the edge has a curved surface, a surface having only a portion with a predetermined radius (curvature), such as a simple chamfered shape, is not included in the inclined surface according to the disclosure.

Further, the number and the shape of the spoke portions and the window portions may be changed as desired.

What is claimed is:

1. A vehicle wheel comprising:
   a hub portion configured to be attached to a vehicle;
   a rim portion that is substantially cylindrical;
   a plurality of spoke portions connected to the rim portion and the hub portion;
   a space between each of the spoke portions that are adjacent to each other, wherein the space penetrates the wheel in a wheel axial direction; and
   an inclined surface is on a wheel back side of each of the spoke portions on each half of the spoke portions in a wheel circumferential direction, wherein
   each inclined surface inclines toward a wheel front side from a center of the spoke portions in the wheel circumferential direction toward the space,
   each inclined surface extends to both outer limits of the spoke portions in the wheel circumferential direction,
   wherein all of the inclined surfaces are in a division on the wheel front side when the spoke portion is divided into two equal portions in the wheel axial direction, and
   the spoke portion includes a thick portion that is thick in the wheel axial direction and a thin portion that is thinner than the thick portion; and
   each inclined surface is in the thin portion, and a thickness of a portion of the thin portion including the inclined surface is constant.

2. The vehicle wheel according to claim 1, wherein:
   a width of the spoke portion in the wheel circumferential direction is larger than a thickness in the wheel axial direction; and at least a part of each inclined surface is in a division closest to a respective one of the spaces when the spoke portion is divided into four equal portions in the wheel circumferential direction.

3. The vehicle wheel according to claim 1, wherein the both outer limits are in a division on the wheel front side when the spoke portion is divided into two equal portions in the wheel axial direction.

\* \* \* \* \*